June 28, 1938. J. SOUSEDÍK 2,121,889
AUTOMATIC FRICTION BRAKE
Filed June 11, 1934
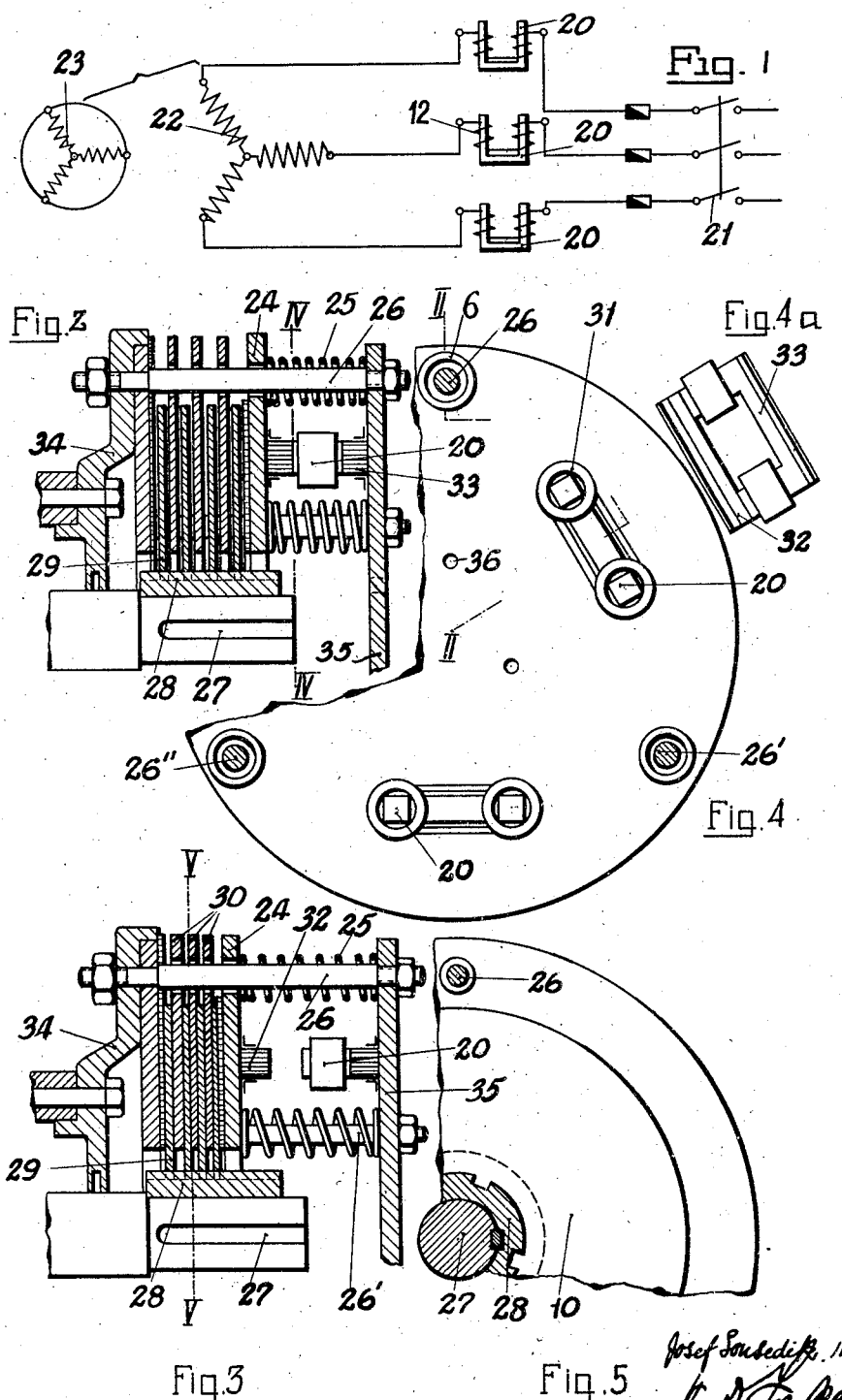
Josef Sousedík, INVENTOR
ATTORNEY Patented June 28, 1938

2,121,889

UNITED STATES PATENT OFFICE 2,121,889

AUTOMATIC FRICTION BRAKE

Josef Sousedík, Moravia, Czechoslovakia

Application June 11, 1934, Serial No. 730,121
In Czechoslovakia February 27, 1933

1 Claim. (Cl. 188—171)

The invention relates to brakes, which operate on electromagnetic principles, and serve automatically to stop an electric motor and the apparatus driven thereby by interrupting the supply circuit and which not only make possible quick stopping of the movement, but also ensures arresting the whole system in the position which it assumes after stopping. The apparatus in accordance with the invention is characterized by a gradual braking operation of the motor without any kind of shock and is especially suitable for hoisting, winding and the like machines, where breaking the circuit without securely arresting would result in the load falling down.

A number of such machines are already known, whose purpose is to ensure the stopping and securing of the lifted load on breaking of the current and its electromagnetic effect. Thus frequently, for example, a band brake is used with a weight held in the "off" position of the electromagnet which is fed from the same current as the motor. In other cases, instead of the weight, the resilience of a pneumatic or hydraulic cylinder or the like is used. Apparatus which depend on mechanical principle, for example on centrifugal force whose diminution after switching off the current and consequent retardation of rotation sets a suitable brake in operation, are likewise known.

However, all these old arrangements have the disadvantage that, on the one hand they are very complicated and often failed through this, and on the other hand, that it is necessary to use various costly and heavy parts such as brake discs, weights, centrifugal bodies and the like which raise the cost price of the whole aggregate, and also that a sudden application of the brake and instantaneous stopping of motion not only cause quick damage to the conveying machine, but also cause breaking of the rope and falling of the load.

All the above disadvantages of the old constructions are removed by the arrangement in accordance with the invention which uses an electromagnet which is drawn to an iron body against a spring or any other pressure apparatus.

In the accompanying drawing an example of the invention is diagrammatically shown.

Fig. 1 shows the switch diagram of an induction motor having a brake according to the invention, and which mainly illustrates the feeding of the magnetizing windings of the electromagnets by means of which the brake is held in the raised (off) position.

Fig. 2 is a diagrammatic sectional view of the brake in the raised (off) position.

Fig. 3 is the same view with the motor braked.

Fig. 4 is a view of the carrying disc with the magnet according to line IV—IV of Fig. 2.

Fig. 4a is a detail of the magnet, while

Fig. 5 is a section of the brake according to line V—V of Fig. 3.

The electromagnets 20, which serve to hold the brake in the "off" position as long as the supply circuit is not broken, are, as shown in Fig. 1, in every phase of the stator circuit of the induction motor, and for example, in series between the switch 21 and the corresponding stator windings 22. The rotor 23 of the motor provided with the brake in accordance with the invention is short circuited as shown in Fig. 3, but can, however, be of any other type, since the construction of the rotor has no relation to the operation of the brake. The phase-electromagnets 20 will be subject to current of constant mains frequency as long as their circuits are not broken so that also at no-load the disc 24, Figs. 2 to 5, is held fast in the position shown in Fig. 2, in which the springs 25 arranged on the carrying bolts 26, 26' and 26'' are compressed. Therefore, free turning of the motor shaft 27 is possible, this being provided with a nave ring 28 keyed fast and upon which the friction lamellae 29 are axially movable but turnable therewith. The non-turning lamellae 30 are slidably attached on the bolts 26, 26' and 26''. If, through a defect, the current supply to the motor stator is interrupted even only in one phase, the total attraction of the still energized magnet or magnets 20 is less than the force of the springs 25 which thus move the disc 24 and cause progressive engagement of the lamellae 29 and 30. The motor is thus progressively brought to a standstill, the brake parts then being in the position illustrated in Fig. 3. On again switching on the current, the electromagnets 20 overcome the springs 25 and attract the disc 24 so that the lamellae 29 are released from engagement with the non-turning lamellae 30 and the motor runs progressively up to normal speed.

As the electromagnets I are in series in the circuit of the stator and therefore subject to the mains frequency, they have to be laminated to lessen the hysteresis loss. The coils, consisting of single windings 31 which are not too strong, are pushed on the laminated bodies 33 which, in order to attain an undisturbed magnetic flux, have the same profile as the lamination groups 32 on the disc 24, so that magnetic leakage is reduced that the discs 24 and 35 on which the magnets are fixed do not require to be made of magnetically conducting material. The bolts 7, 7', 7" are carried on one side of a supporting plate 34 connected with the motor casing and on the other side (the outer) by the carrying disc 35. This plate is provided with corresponding openings 36 for the supply conductors.

Of course, the nave 28 can be made longer than has been determined for the foregoing number of lamellae in order to be able to place a corresponding number of further lamellae thereon in case of greater working safety, so that the friction effect is increased.

The strength of the spring 25 is so chosen that the motor automatically brakes itself even when only one phase of the supply circuit is broken.

The example described is, of course, only given by way of example, and does not limit the scope of the invention.

I claim:—

In an automatic friction brake for an alternating current motor including a driven shaft, a stator winding for each phase and a fixed casing, comprising a plurality of friction discs slidably keyed to said shaft, a plurality of friction rings fixed to said casing but axially slidable relatively to said shaft and interposed between said friction discs, spring means tending to move said discs and rings progressively into engagement and an electromagnet which tends to withdraw the spring means when energized and the windings of which are arranged in series with the corresponding stator winding; the combined force of attraction of said electromagnets exceeding the force of the spring means by less than the force of attraction of any one individual magnet so that even on interruption of the circuit of only one phase the spring means moves the discs and rings progressively into engagement.

JOSEF SOUSEDÍK.